US007203736B1

(12) United States Patent
Burnett et al.

(10) Patent No.: US 7,203,736 B1
(45) Date of Patent: Apr. 10, 2007

(54) FULLY INTEGRATED WEB ACTIVATED CONTROL AND MONITORING DEVICE

(75) Inventors: Alan Mark Burnett, Southampton (GB); David Bryan Keogh, Southampton (GB)

(73) Assignee: Roke Manor Research Limited, Romsey (GB)

( * ) Notice: Subject to any disclaimer, the term of this patent is extended or adjusted under 35 U.S.C. 154(b) by 528 days.

(21) Appl. No.: 10/111,107

(22) PCT Filed: Oct. 18, 2000

(86) PCT No.: PCT/GB00/03979

§ 371 (c)(1),
(2), (4) Date: Aug. 30, 2002

(87) PCT Pub. No.: WO01/31852

PCT Pub. Date: May 3, 2001

(30) Foreign Application Priority Data

Oct. 22, 1999 (GB) ................................. 9925003.7
Oct. 22, 1999 (GB) ................................. 9925004.5
Mar. 18, 2000 (GB) ................................. 0006487.3

(51) Int. Cl.
G06F 15/16 (2006.01)

(52) U.S. Cl. .................................................... 709/219

(58) Field of Classification Search ........ 709/217–219, 709/227–229; 715/733–747
See application file for complete search history.

(56) References Cited

U.S. PATENT DOCUMENTS 5,761,429 A * 6/1998 Thompson .................. 709/224

5,819,039 A * 10/1998 Morgaine .................... 709/217
5,956,487 A * 9/1999 Venkatraman et al. ....... 709/218

(Continued)

FOREIGN PATENT DOCUMENTS

GB           2304952          3/1997

(Continued)

OTHER PUBLICATIONS

Bill Peisel, "Designing the Next Step In Internet Appliances", Electronic Design, Mar. 23, 1998, pp. 50, 52, 56, vol. 46, No. 7, Penton Publishing, Cleveland, Ohio, XP000780455.

(Continued)

*Primary Examiner*—David Wiley
*Assistant Examiner*—Joseph E. Avellino
(74) *Attorney, Agent, or Firm*—Crowell & Moring LLP

(57) ABSTRACT

A web-enabled microcontroller device is provided with both web server functions (310) and generic control and monitoring functions (312). The web-enabled microcontroller device may be embedded in domestic, commercial and industrial hardware. Integrated software for remotely controlling hardware by means of the microcontroller device combines control application code (312) and HTTP server code (310). One implementation of the microcontroller device has a microprocessor coupled to a physical communications unit, a ROM and a RAM. The protocol stack (314) associated with the HTTP server may be permanently coded into the ROM or loaded into the RAM as required. In another implementation, the physical communications unit includes a digital signal processor and a wireless access unit, thereby providing a web-enabled digital wireless access device. In the wireless implementation, the processing of the wireless access physical layer (302) is performed by the digital signal processor and the higher layer processing (310, 312, 314) is performed on the microprocessor.

18 Claims, 5 Drawing Sheets

U.S. PATENT DOCUMENTS

| | | | |
|---|---|---|---|
| 6,112,246 A * | 8/2000 | Horbal et al. ................ | 709/230 |
| 6,198,479 B1 * | 3/2001 | Humpleman et al. ........ | 715/733 |
| 6,260,077 B1 * | 7/2001 | Rangarajan et al. ......... | 719/328 |
| 6,463,458 B1 * | 10/2002 | Nepustil ...................... | 709/203 |
| 6,496,859 B2 * | 12/2002 | Roy et al. .................... | 709/223 |
| 6,529,936 B1 * | 3/2003 | Mayo et al. ................. | 709/202 |
| 6,535,867 B1 * | 3/2003 | Waters .......................... | 707/1 |
| 6,615,088 B1 * | 9/2003 | Myer et al. .................... | 700/20 |
| 6,651,190 B1 * | 11/2003 | Worley et al. ................ | 714/43 |
| 6,680,730 B1 * | 1/2004 | Shields et al. .............. | 345/169 |
| 6,714,977 B1 * | 3/2004 | Fowler et al. ............... | 709/224 |
| 6,976,073 B2 * | 12/2005 | Desoli et al. ................ | 709/224 |
| 2002/0042896 A1 * | 4/2002 | Johnson et al. ................ | 714/47 |
| 2002/0083172 A1 * | 6/2002 | Knowles et al. ............. | 709/225 |
| 2004/0006620 A1 * | 1/2004 | Howard et al. .............. | 709/224 |
| 2004/0049557 A1 * | 3/2004 | Chambers et al. ........... | 709/219 |

FOREIGN PATENT DOCUMENTS

| | | |
|---|---|---|
| GB | 2309567 | 7/1997 |
| WO | WO 96-35286 A1 | 11/1996 |
| WO | WO 99/46746 | 9/1999 |

OTHER PUBLICATIONS

George Lawton, "Dawn of the Internet Appliance", Computer Society, Oct. 1, 1997, pp. 16 & 18, XP000738076.

\* cited by examiner

FULLY INTEGRATED WEB ACTIVATED CONTROL AND MONITORING DEVICE

This invention relates to a fully integrated, Web activated control and monitoring device. The control device of the invention can be used for remotely controlling and monitoring functions in a physical device.

The Internet and World Wide Web are now ubiquitous technologies for information transfer. One prominent data networking standard for information transfer is TCP/IP (Transmission Control Protocol/Internet Protocol). The majority of home computers are now supplied 'Internet Ready' and 'Web-enabled', ensuring that many consumers are not only aware of the technology, but already have it in their homes.

Web servers deliver content according to a given protocol for presentation on a remote client device, using a Web browser. In the original World Wide Web (WWW) concept, the given protocol was a Hypertext Transfer Protocol (HTTP). An HTTP server delivers Hypertext Markup Language (HTML) pages to one or more users, for display by an HTTP browser. The HTML pages are static files containing text and image information. This concept has evolved to include dynamic HTML, whereby interactive pages (having radio buttons and drop down menus for example) provide an interface to other applications such as search engines, databases or online dictionaries. Web servers have evolved so that in addition to supporting HTTP, the Web servers can support other information transfer protocols including a wireless application protocol (WAP), the WAP being particularly appropriate for delivering content in wireless implementations.

By embedding a Web server in a target physical device, the WWW concept can be further extended to include the control and monitoring of the physical device. Examples of suitable target physical devices include video recorders, central heating systems and home security systems. The device being controlled can present a protocol-compliant interface to any network using IP (for example the public Internet, an Intranet or a home network) and can thus interface with any Web browser. The structure and content of the protocol-compliant interface presented to the Web browser is stored entirely on the controlled device.

General discussions of conventional embedded internet servers may be found in Peisel, B "Designing the Next Step in Internet Appliances" ELECTRONIC DESIGN vol. 46, no. 7, pages 50–56, 23 March 1998 and Lawton, G "Dawn of the Internet Appliance", IEEE COMPUTER SOCIETY, vol. 30, no. 10, pages 16 and 18, 1 October 1997.

Consider the case of an HTTP server which can be linked to a control application. The control application in turn interfaces with hardware components of the physical device. Examples of hardware components which can be controlled in this manner include: Digital to Analogue Converters (DAC); Analogue to Digital Converter (ADC); parallel Input/Output (I/O) or serial I/O devices; display devices; and device monitoring logic. Rather than simply serving fixed HTML pages, the HTTP server may deliver control and monitoring information using dynamic Web page graphical constructs, for example radio buttons or pull-down menus. Consequently, the control application provides the HTTP server with device status information in HTML format and HTML formatted menus for the setting of device control parameters. The HTTP content presented to a user may be a simulation (or exact copy) of the interface presented by the physical device being controlled.

In general, Web servers have been designed to operate on high performance, general-purpose computing platforms, and are optimised for serving content pages at high speed to a large number of users. It is known to provide HTTP servers for control applications by embedding a general-purpose computer in the physical device to be controlled or by controlling a number of local devices from a single computer. However, such an approach is clearly unsuitable for consumer applications due to the high cost of implementation.

Alternatively physical devices can be controlled by embedded microprocessors (or microcontrollers) rather than general-purpose computers; Web servers suitable for the embedded microprocessors have been produced. Typically, these Web servers are not fundamentally different in design to those used in larger scale general-purpose computing environments. Generally, the Web server software for the embedded microprocessors is smaller and supports fewer features. However, Web servers for general purpose computers and servers for the embedded microprocessors do still have the following features in common.

Firstly, both types of Web server are implemented as a separate piece of code that executes in a separate thread or process alongside the control application code.

Secondly, an external scheduling system (usually part of an operating system) determines when both the Web server software and the control application software get execution time.

Thirdly, as the control application code and the Web server code are both designed to execute separately, code needed to perform standard tasks will often be duplicated in both, adding to the overall size of the software.

Lastly, both types of Web server code incorporate code which handles differences between protocols. In the case of the HTTP, there is no single standard definition, rather there are multiple standard versions, each of which has many optional features. In addition, there are a number of non-HTTP features that are widely considered to be server options. Since a Web server is typically a separate piece of code, designed to be applied across a wide range of applications, the Web server usually contains code to support functionality that is not used by a given specific application. The implementation of a Web server in an embedded environment as described above is not optimal in a typical consumer appliance implementation using a low cost microcontroller. The memory and processing power available in typical consumer appliances are very restricted.

Ideally, the Web server software for implementation in embedded environments should include no redundant code and the control application software should be able to dictate when any support software, such as the Web server software, receives execution time. When this control application software is implemented in embedded microcontroller devices, the embedded microcontroller devices may be used to replace existing, known microcontroller devices. In addition, the cost and inconvenience of wiring is a significant barrier to home networking. The implementation of a wireless environment is thus desirable and so there is a need for Web server technology in the context of digital radio devices in order to produce a class of physical device particularly appropriate for home networking implementations.

According to the present invention, there is provided a microcontroller device for controlling at least one physical device in response to an incoming communication from a remote user, the incoming communication complying with a predetermined communications protocol, the microcontroller device including: a physical communication unit; a memory unit; and a microprocessor coupled to the physical communication unit and the memory unit, wherein the memory unit stores an integrated piece of software arranged to perform a server function and a control application function and to support protocol stacks, in operation the integrated software is executed by the microprocessor, the incoming communication is received at the physical communication unit, transmitted to the microprocessor, processed in accordance with the integrated software, whereby the server function initially handles the incoming communication and interprets the communication for processing by the control application function whereby the physical device is controlled by the control application function in accordance with commands generated from the interpreted communication and whereby feedback from the physical device is processed and transmitted back to the remote user via the server function.

Advantageously, the integrated piece of software executes a single processing thread, whereby the server function is called and thread mastery is passed to the server function only when incoming communications are received and when response communications are transmitted and whereby thread mastery remains with the control application function in the absence of communication requirements.

Preferably, the physical communication unit includes a UART chip. Equally preferably, the physical communication unit includes a digital signal processor and a wireless access unit. More preferably the digital signal processor is a baseband processor.

Preferably, the microcontroller device is embedded in a single integrated circuit.

Preferably the memory unit includes at least one non-volatile memory unit, the memory unit advantageously, permanently storing the integrated piece of software. More preferably, the non-volatile memory is read only memory (ROM) unit.

Alternatively, the memory unit includes at least one volatile memory unit. The integrated software is preferably stored as an image on the at least one volatile memory unit. The at least one volatile memory unit may be a random access memory (RAM) unit.

Preferably, the server functions provided by the integrated piece of software comply with a communications protocol. More preferably, the communications protocol is a Hypertext Transfer Protocol and protocol stacks supported by the integrated piece of software are compatible with the Hypertext Transfer Protocol. Equally preferably, the communications protocol is a Wireless Application Protocol and protocol stacks supported by the integrated piece of software are compatible with the Wireless Application Protocol.

Preferably, there is provided a physical device controlled by the microcontroller device. More preferably, there is provided a communications network comprising at least one physical device controlled by the microcontroller device.

According to the present invention, there is also provided a method of remotely controlling a physical device having at least one function, the method including: receiving incoming communications from a remote user, the remote user communications complying with a predetermined communications protocol and including application-specific content; registering a plurality of command handlers on a list, each command handler being provided to handle at least one portion of the application-specific content; for the or each portion of the application-specific content of each respective remote user communication, calling a corresponding command handler from the list of registered command handlers; generating an interpreted remote user communication by applying the called command handler to the content of the respective remote user communication; generating control commands for the physical device for controlling the at least one function of the physical device in response to the interpreted remote user communication; performing the at least one function on the physical device in response to the control commands; receiving feedback from the physical device upon performance of the at least one commanded function; calling an appropriate command handler to interpret the feedback; generating a response communication compliant with the predetermined communications protocol from the interpreted feedback; and transmitting the response communication to the remote user.

The method may further comprise: upon receipt of incoming communications, calling a server engine to process the communications; once an interpreted remote user communication has been generated, passing thread mastery from the server engine to a control application for the generation of control commands; and upon generation of the response communication passing thread master from the control application to the server engine.

Preferably, a memory unit having ail integrated piece of software recorded thereon is provided, wherein the integrated piece of software performs the method above.

At least one embodiment of the present invention will now be described, by way of example only, with reference to the following drawings, in which.

Throughout the following description, identical reference numerals are used to identify like parts.

Figure 1:
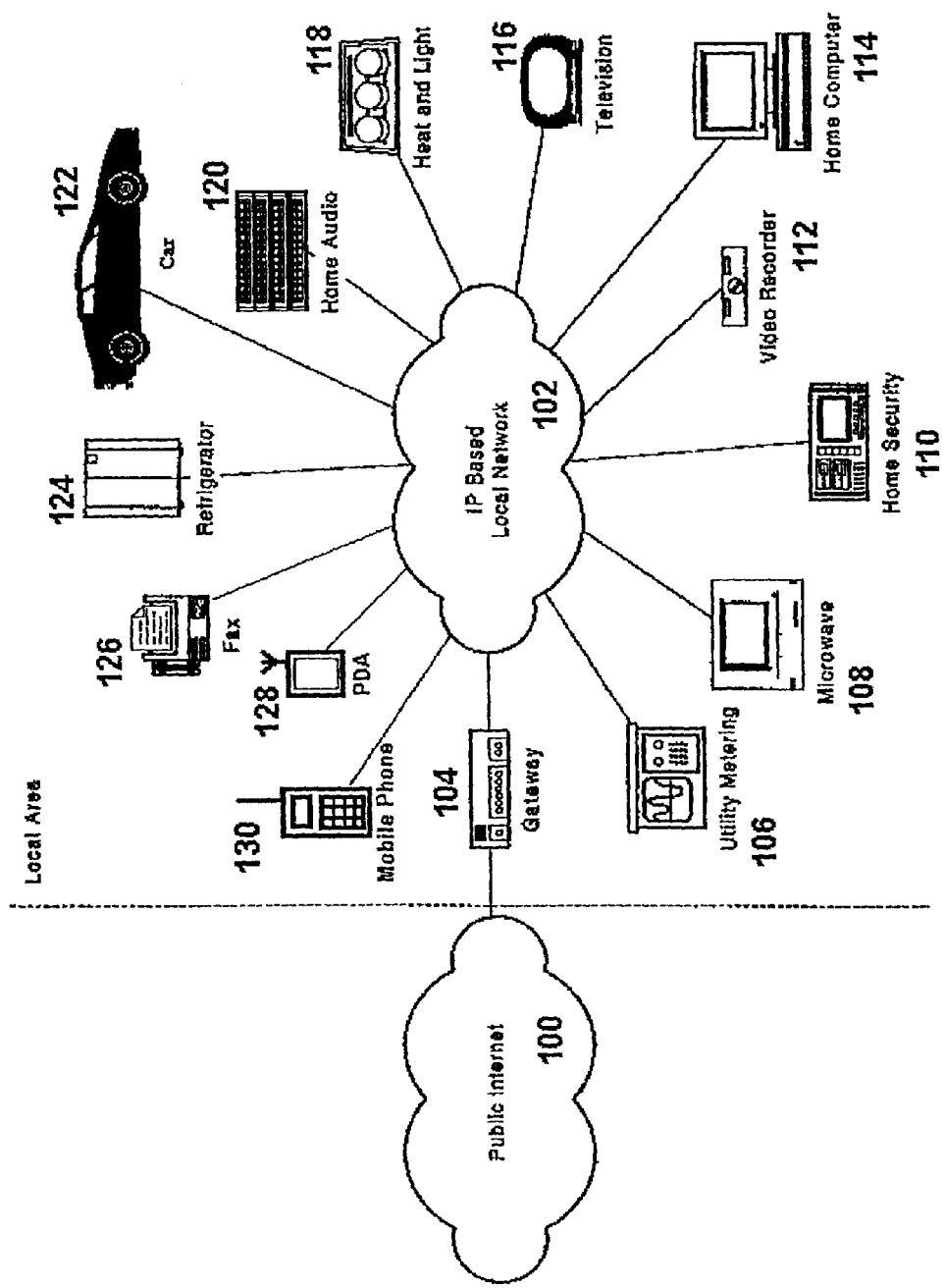
FIG. 1 is a schematic diagram of an IP-based home network.

Referring to FIG. 1, an IP based home network 102 is coupled to a plurality of physical devices, the IP based home network 102 being in communication with the public Internet 100 via an IP gateway 104. The plurality of physical devices can include: computing devices, such as a home computer 114 or a Personal Digital Assistant (PDA) 128; home entertainment devices, such as a television 116, a video recorder 112, home audio equipment 120; domestic appliances, such as a refrigerator 124, a fax machine 126, a mobile telephone 130, a microwave oven 108 or heating and lighting facilities 118; security equipment 110; a utility meter 106, such as a gas meter or an electricity meter; and automotive monitoring equipment such as car engine management equipment 122.

Remote control of the plurality of physical devices requires that each physical device has a microcontroller arrangement for control and monitoring of the physical device, and embedded HTTP server software. The HTTP server software permits communication with a management terminal, for example the home computer 114 or the wireless web enabled PDA 128. The plurality of physical devices are managed using an HTTP browser implemented upon the management terminal in order to present information generated by the HTTP server software in the form of content pages. In order to manage the plurality of physical devices, the management terminal requires respective IP addresses associated with each of the plurality of physical devices. The respective IP addresses can be obtained by an automatic discovery process, for example the Bluetooth 'Service Discovery Protocol'.

Although reference has been made to "Bluetooth" it should be appreciated that other wireless access techniques, for example, Infrared Data Association (IrDA) or Shared Wireless Access Protocol (SWAP), can be used to reduce the cost and complexity of network wiring.

Figure 2A:
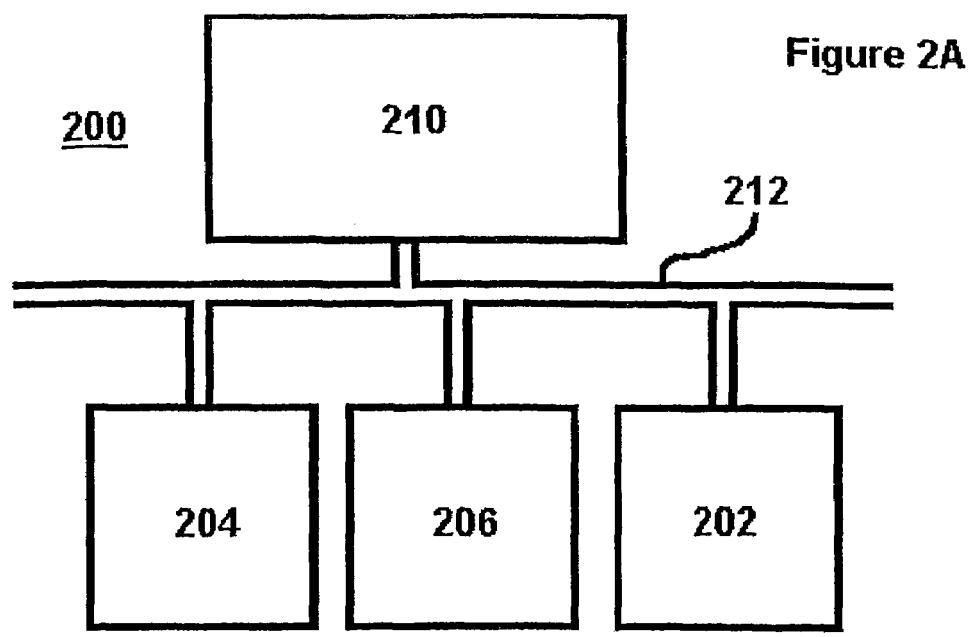
FIG. 2A is a schematic diagram of the layout of a first web-enabled microcontroller device.

In a first embodiment of the invention (FIG. 2A), a web-enabled microcontroller arrangement 200 includes a physical communications unit 202 coupled to a microprocessor 210 via a first data bus 212, a non-volatile memory unit 204 (e.g. ROM, EEPROM, EPROM or flash memory) and a volatile memory unit 206 (e.g. RAM or random access flash) also being coupled to the first data bus 212. The microcontroller arrangement 200 is suitable for connection to a network for communications with remote devices coupled to the network by means of the physical communications unit 202, for example, a Universal Asynchronous Receiver/Transmitter chip (UART).

Figure 3:
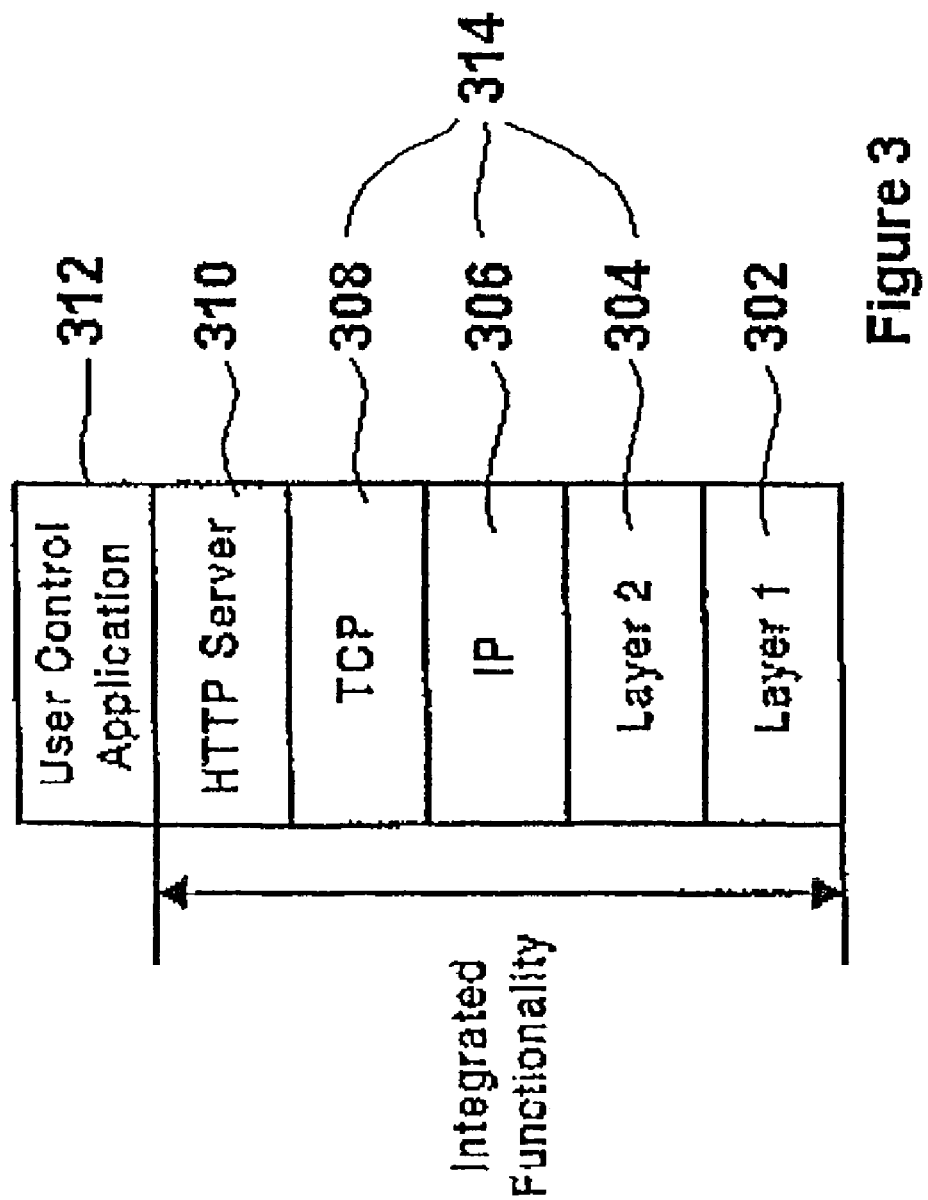
FIG. 3 is a first reference model for the first web-enabled generic microcontroller device of FIG. 2A.

Referring to FIG. 3, the web-enabled microcontroller arrangement 200 implements an integrated protocol stack 314 providing a data link layer (Layer 2) 304, an IP layer 306 and a TCP layer 308, the IP layer 306 and the TCP layer 308 providing transmission and networking layers. The integrated protocol stack 314 is overlaid upon a physical layer 302 (Layer 1). An HTTP layer 310 is overlaid upon the TCP layer 308, the HTTP layer 310 being implemented by HTTP server software. The HTTP server software, the integrated protocol stack 314 and user control application software 312 all execute on the embedded microprocessor 210. The physical layer 302, the data link layer 304, the IP layer 306, the TCP layer 308 and the HTTP layer 310 are either coded permanently into the non-volatile memory unit 204 (for example, mask programmed onto ROM) or provided as an image which may be loaded by a software developer into the volatile memory unit 206. In the latter case, the software developer is free to generate control application software specific to the hardware of the controlled device and linking directly to the HTTP server software.

The code build process incorporates the building of both control application code and HTTP server code to give a single piece of web-enabled software. This approach gives a number of advantages in terms of overall size and complexity of the web-enabled software, and in terms of utilisation of available processing power.

Firstly, the HTTP server software presents a generic user interface with content dependent only on the controlled device itself. The HTTP server software uses a networking standard (TCP/IP) which allows a device to be monitored or controlled from anywhere in the world with no translation whatsoever of the content presented by the HTTP server. The device can be controlled from a known platform; for example, a workstation, the home personal computer 114 or the PDA 128.

Secondly, the HTTP server code and the control application code are combined to form a single piece of software in which the HTTP server code only executes when called by the control application code. By structuring the HTTP server code so that it periodically returns thread mastery to the control application code throughout the processing of an incoming HTTP communication, and by providing parameters to configure this processing both dynamically and as part of the code build, the application is given a high degree of control over the available processing power. When active, the HTTP server can be seen as making use of spare capacity not used for the control application.

Thirdly, since the HTTP server code is part of an implementation specific code build process, the web-enabled control application software includes code to support any and all desirable HTTP server features. By the use of standard code building techniques and suitable structuring of the HTTP server code, any HTTP server code supporting functionality that is optional, yet not relevant for the specific implementation for the physical device, can simply be excluded from the final software as part of the code build process for that implementation.

Finally, as the control application code and HTTP server code form part of the same piece of web-enabled software, they can both make use of the same sections of code to perform standard tasks rather than duplicate these sections in each case.

Figure 2B:
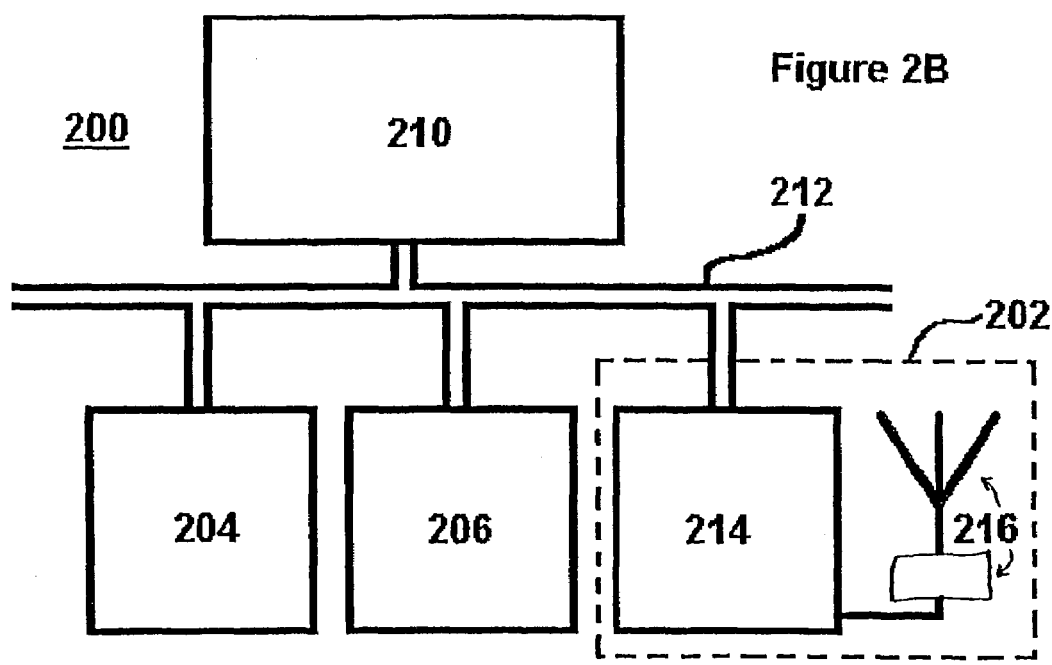
FIG. 2B is a schematic diagram of the layout of a second web-enabled microcontroller device for use in a wireless network environment.

In a second embodiment of the present invention (FIG. 2B), the microcontroller arrangement 200 differs from that of the first embodiment (FIG. 2A) by the physical communication unit 202 having an embedded DSP 214 and a radio frequency (RF) transceiver device 216, for transmitting and receiving signals.

In the context of the reference model of FIG. 3, the physical layer 302 is supported by the transceiver unit 216 and the embedded DSP 214. Signals received by the transceiver unit 216 are processed by the embedded DSP 214, the embedded DSP 214 can also support the (baseband) data link layer 304 (layer 2). Although specific apparatus have been described for the full or partial support of layers 1 and 2 of the reference model, it should be appreciated that other hardware known in the art can be used to support the layers 1 and 2.

Some functionality of the data link layer 304, the IP layer 306, the TCP layer 308 and the HTTP layer 210 is provided by the embedded microprocessor 210. Typical wireless access technologies that use this device architecture include: Digital Enhanced Cordless Telecommunications (DECT), Global System for Mobile communications (GSM), Bluetooth, Universal Mobile Telecommunications System (UMTS), IrDA or SWAP.

It should be understood that the embedded microprocessor 210 can be instructed to perform the operations of the DSP 214 in addition to Layer 2 and control processing, thus the DSP 214 is not absolutely essential. Alternatively, logic circuitry can be provided to perform some or all tasks of the DSP 214 and the embedded microprocessor 210.

Figure 4:
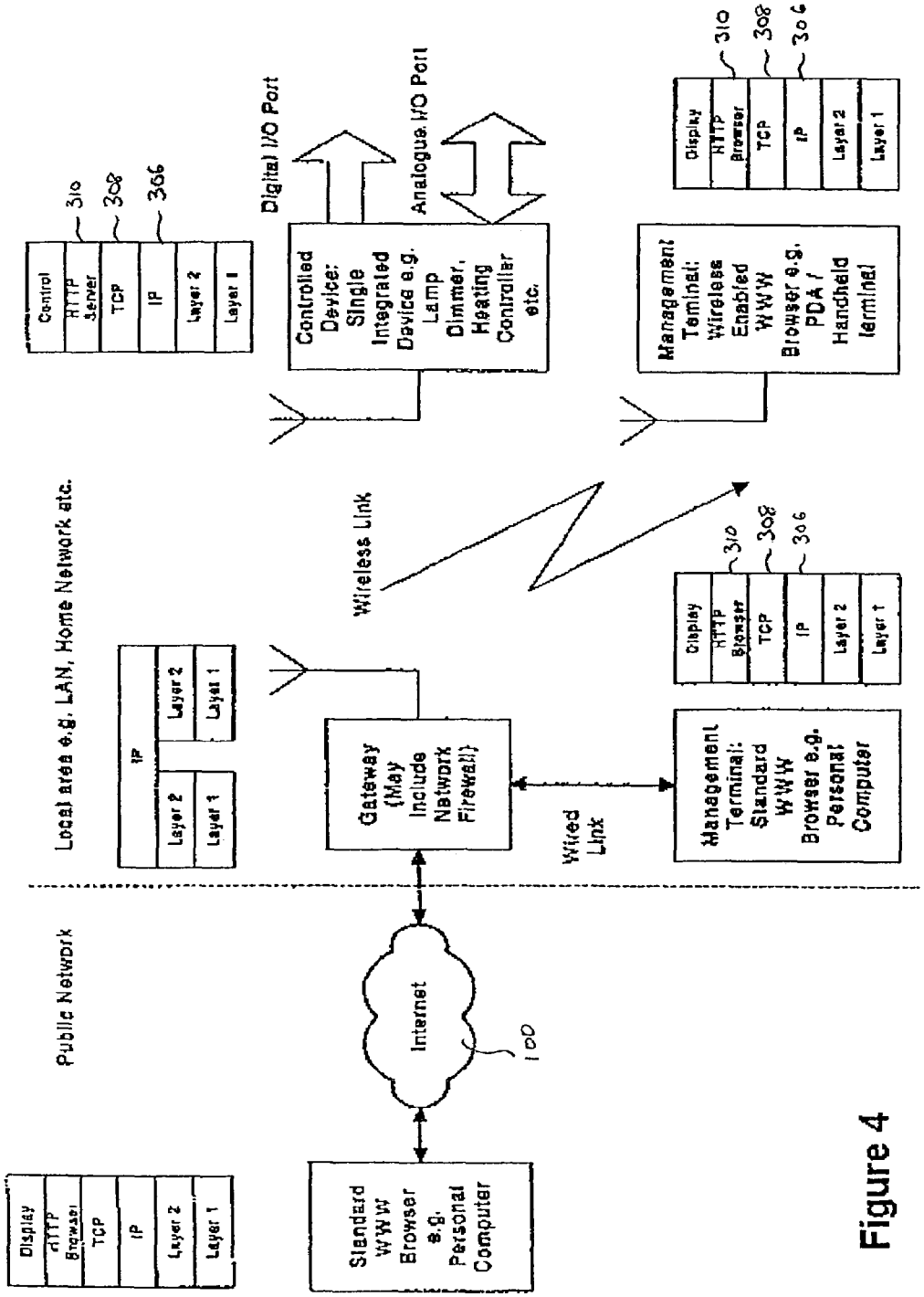
FIG. 4 is a schematic diagram of a network showing wireless and wired inter-working between devices using different physical layer media.

Referring to FIG. 4, the wired and wireless inter-working between devices of FIG. 1 can be seen in more detail. Layers 1 and 2 of the wired part of the network differ from layers 1 and 2 of the wireless part of the network. However, the IP layer 306, the TCP layer 308 and the HTTP server layer 310 are identical, making inter-working straightforward.

In addition to the above described applications, physical devices comprising the microcontroller arrangement 200 can be used for diagnostic and configuration functions by a remote service centre. For example, a user can have difficulty configuring one of the physical devices or the physical device may appear to be faulty. The user can connect the physical device to the remote service centre via the public Internet 100, where skilled service personnel can run diagnostics remotely or assist the user in the configuration of the physical device. Additionally, the home entertainment equipment incorporating the embedded Web server can include specialised configuration and diagnostic functions not accessible to the user. The configuration and diagnostic functions, inaccessible to the user, can be accessed by a remote customer service centre via the public Internet 100.

The home security systems 110 can also have additional remote management features. A security company can use embedded HTTP server technology to provide additional management services to a client. The HTTP server software can be used to control and monitor audio and video surveillance equipment, and also to control building infrastructure functions, for example, heat and power systems.

In another application, the utility meter 106 can be read and controlled remotely by both a customer and a utility provider via the wired public Internet 100 or a wireless network in order to save on collection/reading costs and to provide a common user interface.

The HTTP server software embedded in the car engine management system 122 can provide a valuable diagnostic tool. The engine management system 122 collects performance and service interval information, which can be interrogated locally by a garage, or remotely over the public Internet 100 by a manufacturer's service centre or a breakdown service. Information gathered can be used for a number of purposes including: by the garage to identify items requiring adjustment/replacement during service; by the garage to identify a fault after breakdown; by the breakdown service to identify a fault before dispatching roadside assistance; and by the manufacturer to gather performance information over the life of a vehicle.

In order to exclude unauthorised users from the home IP network 102 connected to the public Internet 100 where authorised users are relatively unskilled, a firewalling technique is employed. In general, the firewalling technique restricts access to local networks from the unauthorised users. The firewalling technique is implemented at the gateway 104 between the public Internet 100 and the home IP network 102. Access to the home IP network 102 is restricted by applying security measures known in the art including filtering of incoming packets on combinations of identification numbers including source IP addresses, destination IP addresses, TCP/IP port numbers and UDP (User Datagram Protocol) port numbers.

In a wired network the firewalling function is performed by an IP access router known in the art acting as a Local Area Network (LAN) switch/router for the controlled devices connected to it. However, in a wireless network, it is possible that the gateway is only an access point, and performs no switching or routing functions for the devices in communication with the wireless network. The firewalling technique is still required for the wireless network, but no physical media switching is needed. Consequently, the gateway 104 comprises a firewalling device implementing the firewalling technique and the protocol relay function in order to provide an access point to the public Internet 100 to a home IP network 102. In this case, the firewalling device is just another web-enabled physical device and can be managed, configured and diagnosed remotely, with expert help as required.

Figure 5:
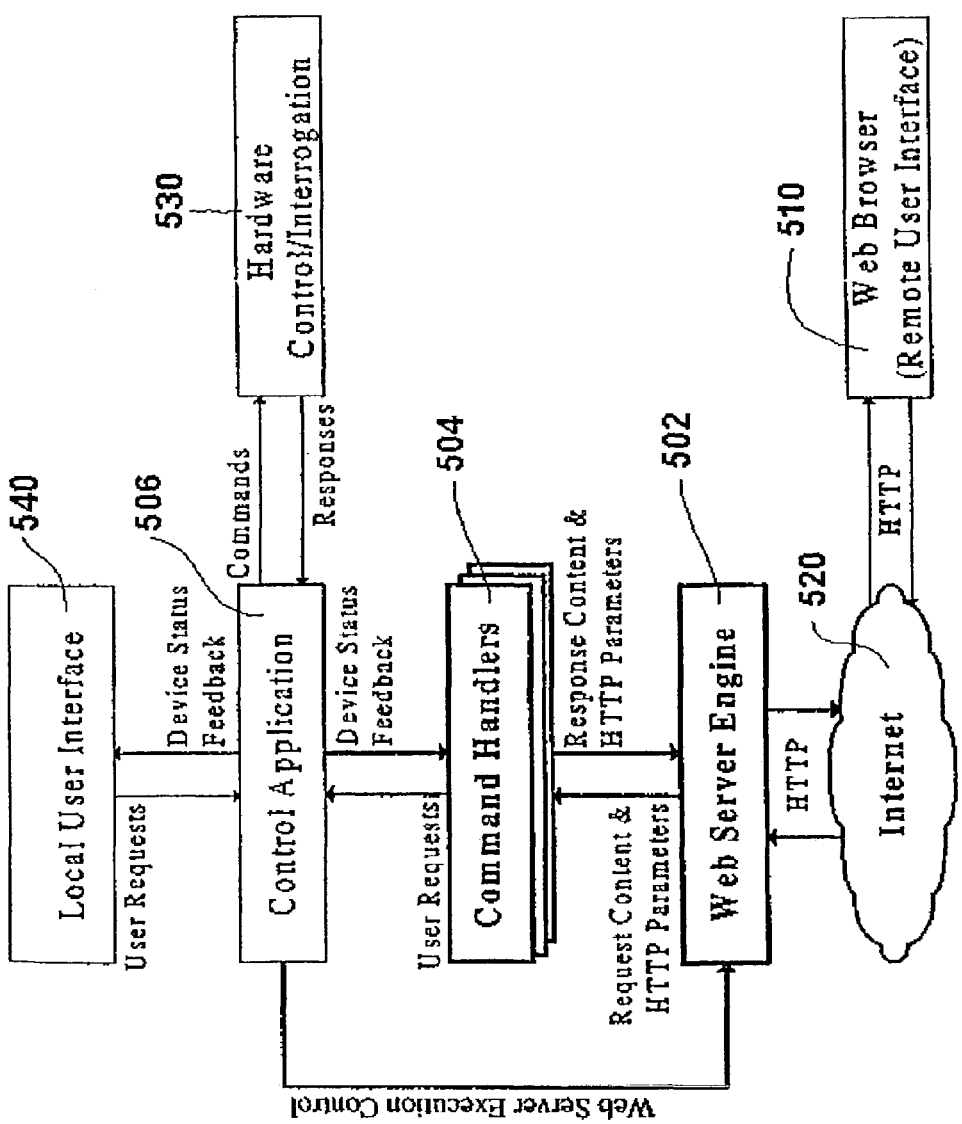
FIG. 5 is a schematic diagram of the integration of an HTTP server with a control application.

Referring to FIG. 5, the control application 506 is capable of relaying commands to a hardware control module 530 and receives responses from the hardware control module 530. The HTTP server software includes an HTTP server engine 502 and a plurality of command handlers 504. Each command handler 504 is a piece of application specific code that the HTTP server engine 502 uses to handle a respective application specific aspect of an HTTP communication for the control application 506.

The control application 506 registers each command handler 504 with the HTTP server engine 502. The HTTP server engine 502 then calls one of the plurality of command handler 504 appropriate for handling a respective application specific aspect of an HTTP communication at various stages of the HTTP communication. The registration process associates a textual name with each command handler 504, thus allowing the appropriate command handler 504 to be specified within the HTTP communication (not shown). The HTTP server engine 502 looks for textual names of command handlers 504 within HTTP communications and maps each textual name found, using the list of registered command handlers, to an appropriate corresponding command handler 504.

Furthermore, the command handlers 504 are specific to the hardware ultimately being controlled through the hardware control module 530. Any parameters and context specific content passed by the HTTP server engine 502 to the control application 506 via a given command handler 504 are interpreted by the given command handler 504, the command handler 504 acting as an interface between the control application 506 and the Web server engine 502. In response to the parameters and context specific content delivered via the command handler 504, the control application 506 performs whatever action is appropriate given the nature of the HTTP communication (not shown). The command handlers 504 also interpret the results of actions by the control application 506 and act as the interface back to the HTTP server engine 502, for example the command handlers 504 identify errors and/or produce parameters and context specific content for the HTTP server engine 502 to format into an outgoing HTTP communication (not shown). The HTTP server engine 502 handles all aspects of the HTTP connection, from receiving and sending of HTTP communications, to parsing and formatting the parameters and context specific content.

The HTTP server engine 502 also handles sequencing, by calling an appropriate command handler 504 at various points throughout the process of handling an HTTP communication. The sequencing is, however, still under the overall control of the control application 506, due to other features of the HTTP server software. The control application 506 can, either as part of the build process or dynamically for each HTTP communication, specify parameters, for instance, how much data may be sent or received over the TCP/IP connection before returning execution to the control application 506. Additionally, in the sequence of events that are required to handle an HTTP communication, there are fixed points where the control application 506 can define whether the HTTP server engine 502 continues automatically with the next event of the sequence or returns execution to the control application 506 after each event. The HTTP server engine 502 therefore is only allowed execution time when called by the control application 506. The amount of execution time allocated at each call to the HTTP server engine 502 can thus be configured, as can the number of simultaneous HTTP communications that can be handled.

The user can still interact locally with the hardware of the physical device through a local user interface 540. Local user communications (not shown) are handled directly by the control application 506, the control application 506 acting as an interface to the hardware control module 530. Feedback from the hardware control module 530 returns to the user interface 540 via the control application 506.

It will be understood that, although the foregoing description is concerned with HTTP server code, other protocols can be adopted in place of hypertext transfer protocol. Most notably the Wireless Application Protocol (WAP) is suitable for the implementation of a Web server in a wireless environment. Suitable alternative protocols within which the invention can be applied include file transfer protocol (FTP), Session Initiation Protocol (SIP), Service Location Protocol (SLP), telnet and secure HTTP (SHTTP). Suitable protocol stacks for the physical layer 302 and the data link layer (Layer 2) 304 include: X.25, AppleTalk, Ethernet and asynchronous transfer mode (ATM).

The invention claimed is:

1. A system comprising:
   at least one physical device; and
   a microcontroller which controls said at least one physical device in response to an incoming communication from a remote user, which incoming communication complies with a predetermined communications protocol; wherein
   said microcontroller includes a physical communication unit, a memory unit, and a microprocessor coupled to the physical communication unit and the memory unit,
   the microcontroller is integrated with the at least one physical device that it controls;
   the memory unit stores an integrated piece of software that executes a single processing thread and is configured i) to perform a server function and a control application function, and ii) to support protocol stacks;
   in operation the integrated software is executed by the microprocessor, and the incoming communication is received at the physical communication unit, transmitted to the microprocessor, and processed in accordance with the integrated software;
   the physical device is controlled by the control application function in accordance with commands generated from an interpreted communication;
   feedback from the physical device is processed and transmitted back to the remote user via the server function;
   thread mastery remains with the control application function in the absence of communication requirements, and is passed to the server function only when incoming communications are received and when response communications are transmitted; and
   during processing of a communication, the server function periodically returns thread mastery to the control application function.

2. The system according to claim 1, wherein the physical communication unit includes a UART chip.

3. The system according to claim 1, wherein the physical communication unit includes a digital signal processor and a wireless access unit.

4. The system according to claim 3, wherein the digital signal processor is a baseband processor.

5. The system according to claim 1, wherein the microcontroller device is embedded in a single integrated circuit.

6. The system according to claim 1, wherein the memory unit includes at least one non-volatile memory unit.

7. The system according to claim 6, wherein the at least one non-volatile memory unit permanently stores the integrated piece of software.

8. The system according to claim 6, wherein the at least one non-volatile memory unit is a read only memory unit.

9. The system according to claim 1, wherein the memory unit includes at least one volatile memory unit.

10. The system according to claim 9, wherein the integrated piece of software is stored as an image on the at least one volatile memory unit.

11. The system according to claim 9, wherein the at least one volatile memory unit is a random access memory unit.

12. The system according to claim 1, wherein the server function provided by the integrated piece of software complies with the predetermined communications protocol.

13. The system according to claim 12, wherein:
   the communications protocol is a Hypertext Transfer Protocol; and
   protocol stacks supported by the integrated piece of software are compatible with the Hypertext Transfer Protocol.

14. The system according to claim 12, wherein:
   the communications protocol is a Wireless Application Protocol; and
   protocol stacks supported by the integrated piece of software are compatible with the Wireless Application Protocol.

15. A method of operating a microcontroller device for remotely controlling a physical device having at least one function, the method including:
   integrating said microcontroller device with said physical device;
   receiving incoming communications from a remote user, the remote user communications complying with a predetermined communications protocol and including application-specific content;
   registering a plurality of command handlers on a list, each command handler being provided to handle at least one portion of the application-specific content;
   for the or each portion of the application-specific content of each respective remote user communication, calling a corresponding command handler from the list of registered command handlers;
   generating an interpreted remote user communication by applying the called command handler to the content of the respective remote user communication;
   generating control commands for the physical device for controlling the at least one function of the physical device in response to the interpreted remote user communication;
   for said at least one portion of the application-specific content of each respective remote user communication, calling a corresponding command handler from the list of registered command handlers;
   performing the at least one function on the physical device in response to the control commands;
   receiving feedback from the physical device upon performance of the at least one commanded function;
   calling an appropriate command handler to interpret the feedback;
   generating a response communication compliant with the predetermined communications protocol from the interpreted feedback; and
   transmitting the response communication to the remote user; wherein,
   upon receipt of incoming communications, a server function is called to process the communications;
   once an interpreted remote user communication has been generated, thread mastery is passed from the server function to a control application for the generation of control commands; and
   upon generation of the response communication thread mastery is passed from the control application to the server function;
   during processing of a communication, the server function periodically returns thread mastery to the control application; and
   said server function and said control application are combined in a single integrated software unit.

16. A memory unit having an integrated piece of software recorded thereon, wherein the integrated piece of software performs the method as claimed in claim 15.

17. A microcontroller device comprising:
a physical communication unit;
a memory unit; and
a microprocessor coupled to the physical communication unit and the memory unit; wherein,
the microcontroller device is adapted to be coupled to an associated physical device, to provide a network identity to the physical device in a network which is compliant with a predetermined protocol, and which includes a plurality of microcontroller devices and associated physical devices;
the microcontroller device controls the associated physical device in response to an incoming communication from a remote user, which incoming communication complies with the predetermined protocol;
the memory unit stores an integrated piece of software that executes a single processing thread and is configured i) to perform a server function and a control application function, and ii) to support protocol stacks;
in operation the integrated software is executed by the microprocessor, and the incoming communication is received at the physical communication unit, transmitted to the microprocessor, and processed in accordance with the integrated software;
the physical device is controlled by the control application function in accordance with commands generated from an interpreted communication;
feedback from the physical device is processed and transmitted back to the remote user via the server function;
thread mastery remains with the control application function in the absence of communication requirements, and is passed to the server function which is executed only when incoming communications are received and when response communications are transmitted; and
during processing of a communication, the server function periodically returns thread mastery to the control application function.

18. A communications network comprising:
a plurality of microcontrollers and associated physical devices; wherein,
each microcontroller has a network address in accordance with a communications protocol operating on the communications network, and is operably coupled to its associated physical device to control the associated physical device in response to an incoming communication from a remote user, which incoming communication complies with the predetermined protocol;
each of said microcontrollers comprises a physical communication unit, a memory unit; and a microprocessor coupled to the physical communication unit and the memory unit;
the memory unit stores an integrated piece of software that executes a single processing thread and is configured i) to perform a server function and a control application function, and ii) to support protocol stacks;
in operation the integrated software is executed by the microprocessor, and the incoming communication is received at the physical communication unit, transmitted to the microprocessor, and processed in accordance with the integrated software;
the physical device is controlled by the control application function in accordance with commands generated from an interpreted communication;
feedback from the physical device is processed and transmitted back to the remote user via the server function;
thread mastery remains with the control application function in the absence of communication requirements, and is passed to the server function which is executed only when incoming communications are received and when response communications are transmitted; and
during processing of a communication, the server function periodically returns thread mastery to the control application function.

\* \* \* \* \*